United States Patent Office 3,445,449
Patented May 20, 1969

3,445,449
AZOPHTHALOCYANINE DYESTUFFS
Fritz Meininger and Hartmut Springer, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 27, 1965, Ser. No. 475,248
Claims priority, application Germany, July 29, 1964, F 43,600
Int. Cl. C09b 29/38, 45/28
U.S. Cl. 260—147  6 Claims

ABSTRACT OF THE DISCLOSURE

Water-soluble azophthalocyanine dyestuffs characterized by the presence of chloroethylsulfonyl, sulfatoethylsulfonyl, acetoxyethylsulfonyl, vinylsulfonyl, chloroethylsulfonylamino, sulfatoethylsulfonylamino, acetoxyethylsulfonylamino or vinylsulfonylamino reactive groups, which dyestuffs are distinguished by high absorptivity and tinctorial strength, and are very fast to wetting and to light.

The present invention relates to novel azophthalocyanine dyestuffs and to a process for preparing same; in particular, it relates to water-soluble azophthalocyanine dyestuffs corresponding to the general formula

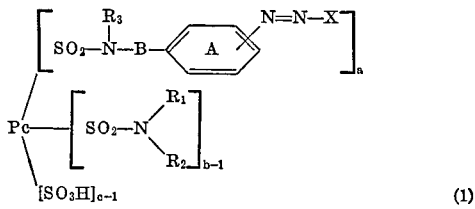

(1)

wherein Pc stands for a substituted or an unsubstituted, preferably a metal-containing phthalocyanine nucleus, B represents a direct linkage or a bivalent organic bridge member, $R_1$ and $R_3$ are hydrogen atoms or substituted or unsubstituted alkyl or aryl groups which may be equal or different or may be connected with one another by ring closure, $R_2$ represents a hydrogen atom or an aliphatic radical which together with the bridge member B may be connected by ring closure, a, b and c each stand for numbers from 1 to 4 the sum of which, however, amounts to at most 6, the benzene nucleus A may carry additional substituents, especially groups imparting solubility in water and X represents the radical of an azo component of the benzene, naphthalene, pyrazolone or β-ketocarboxylic acid arylamide series which may be substituted by groups imparting solubility in water and which contains one or several times the group corresponding to the general formula

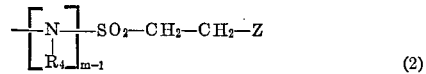

(2)

wherein $R_4$ represents a hydrogen atom or an alkyl group which may be substituted, m stands for the integers 1 or 2, and Z represents a radical of a monobasic or a polybasis inorganic or organic acid or a derivative thereof, which radical may be split off in the form of an anion, or the group corresponding to the general formula

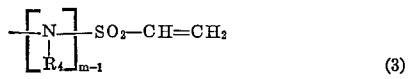

(3)

wherein $R_4$ and m have the meanings given above.
By a bivalent organic bridge member B there are to be understood, for instance, the groupings corresponding to the formulae

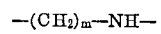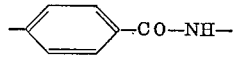
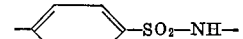
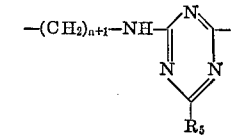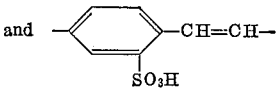

wherein n stands for an integer of 1 to 6 and $R_5$ represents, for instance, an amino group or an etherified hydroxy or mercapto group and, in particular, the radical of an organic amine which may be substituted.

The hitherto unknown dyestuffs are obtained according to known methods by coupling or condensation. The preparation of the water-soluble azophthalocyanine dyestuffs of the general formula (1) is suitably carried out by coupling the diazo compounds of amines corresponding to the general formula

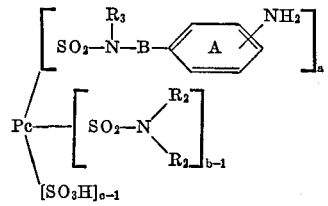

(4)

wherein Pc, B, $R_1$, $R_2$, $R_3$, a, b and c have the meanings given above and wherein the benzene nucleus A may carry additional substituents, particularly groups imparting solubility in water, with azo components of the benzene, naphthalene, pyrazolone or β-ketocarboxylic acid arylamide series which may be substituted by groups imparting solubility in water and which contain one or several times the groups of the Formula 2 or 3, respectively or one or several times the group corresponding to the general formula

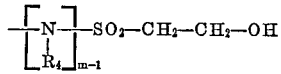

(5)

wherein $R_4$ and m have the meanings given above, and
(a) Isolating dyestuffs which contain groups of the Formula 3,
(b) Isolating dyestuffs containing groups of the Formula 2 or converting them by treatment with alkaline agents, such, for example, as sodium carbonate or sodium hydroxide, into dyestuffs containing groups of the Formula 3,
(c) Converting the dyestuffs containing groups of the Formula 5 at first by treating them with organic or inorganic acids or derivatives thereof, such as for instance, sulfuric acid or acetic acid anhydride, into dyestuffs containing groups of the Formula 2 and isolating the dyestuffs thus obtained or converting them by treatment with alkaline agents, such as sodium carbonate or sodium hydroxide, into dyestuffs containing groups of the Formula 3.

The above-mentioned diazo compounds of amines of the general Formula 4 which are used as starting materials for the process of the present invention, may be obtained from the amines of the Formula 4 on which they are based, according to known methods, for instance by treatment with sodium nitrite in the presence of mineral acids, especially hydrochloric acid. The diazotization may, furthermore, be effected by means of nitrosylsulfuric acid and likewise in the presence of α-naphthalenesulfonic acid. The diazotizable amines of the Formula 4 required for this purpose are obtained, for instance, by reaction of phthalocyanine-sulfonic acid chlorides with amines of the general formula

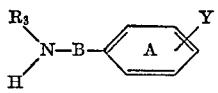

(a)

wherein B and $R_3$ have the meanings given above, the benzene nucleus A may carry additional substituents, particularly groups imparting solubility in water, and Y represents an amino group or a group convertible into an amino group, such, for instance, as an acetylamino- or a nitro group which, by subsequent saponification of the acetylamino group or reduction of the nitro group may likewise be converted into amino groups. When operating in this way, the condensation of the phthalocyanine-sulfonic acid chlorides with the amines of the Formula a may be carried out in the presence of amines corresponding to the general formula

(7)

wherein $R_1$ and $R_2$ have the meanings given above, and, if desired, with simultaneous or subsequent saponification of a part of the sulfonic acid chloride groups.

As examples for suitable compounds of the Formula a there are mentioned the following:

1,3-diaminobenzene, 1,4-diaminobenzene, 1-amino-3-acetaminobenzene, 1-amino-4-acetaminobenzene, 1,3-diaminobenzene-4-sulfonic acid, 1,4-diaminobenzene-2-sulfonic acid, 1,4-diaminobenzene-3-carboxylic acid, 2,5-diamino-1-chlorobenzene, 2-acetamino-4-amino-anisole, 2-acetamino-4-amino-toluene, 3-nitrobenzylamine, 4-nitrobenzylamine, 2-methoxy-5-nitrobenzylamine, 3-nitro-4-methoxybenzylamine, 2-methyl-5-nitrobenzylamine, 3-nitro-4-methylbenzylamine, 2-chloro-5-nitrobenzylamine, 3-nitro-4-chlorobenzylamine, 3-amino-4-methoxy-benzylamine, 3-amino-4-methylbenzylamine, 3-amino-4-chlorobenzylamine, N-methyl-3-nitrobenzylamine, N-methyl-4-nitrobenzylamine, N-(4-nitrophenyl)-ethylenediamine, N-4 - nitro - 2 - sulfophenyl) - ethylenediamine, N - (4-aminophenyl)-piperazine, N-(4-nitrophenyl)-piperazine, N-(4-nitro-2-sulfophenyl)-piperazine, β-(4-nitrophenyl-ethylamine, benzidine, 4,4′-diaminostilbene-2,2′-di-sulfonic acid as well as the compounds corresponding to the formulae

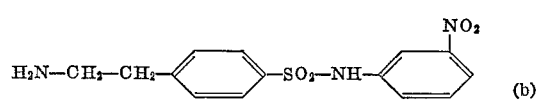

(b)

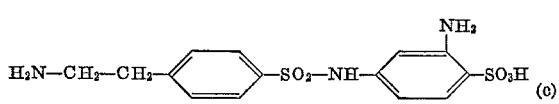

(c)

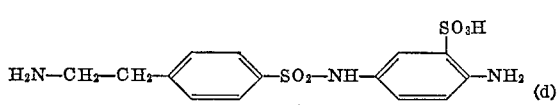

(d)

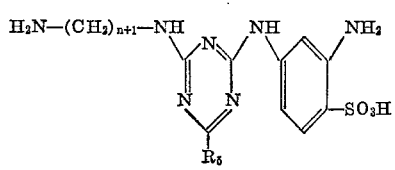

(e)

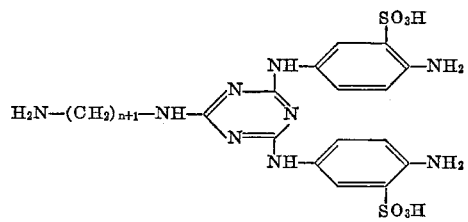

(f)

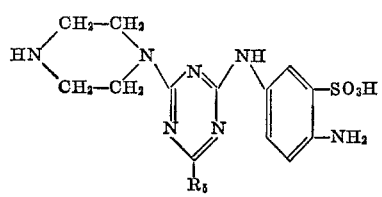

(g)

wherein $n$ and $R_5$ have the meanings given above. In detail, the above-mentioned amines can be prepared according to methods usually applied for the preparation of compounds of said type. For example, the amines of Formulae b, c and d are obtained by converting N-acetyl-β-phenylethylamine by treatment with chlorosulfonic acid into 1-(β-acetylamino-ethyl) - benzene - 4 - sulfonic acid chloride, reacting the latter with 3-nitroaniline, 1,3-diaminobenzene-4-sulfonic acid or 1,4-diamino-benzene-2-sulfonic acid and saponifying with sodium hydroxide solution the condensation products obtained in order to obtain the free amines.

The amines of the Formula e may be obtained in a simple manner by reacting 1 mol of cyanuric chloride in neutral, aqueous suspension successively with 1 mol of 1,3-diamino-benzene-4-sulfonic acid, 1 mol of a compound of the formula $HR_5$ and 1 mol of an alkylenediamine of the formula $H_2N—(CH_2)_{n+1}—NH_2$, wherein $R_5$ and $n$ have the meanings given above, while maintaining certain temperatures. For instance, by reacting cyanuric chloride with 1,3-diaminobenzene-4-sulfonic acid, 1-aminobenzene-4-sulfonic acid and ethylenediamine the compound corresponding to the formula

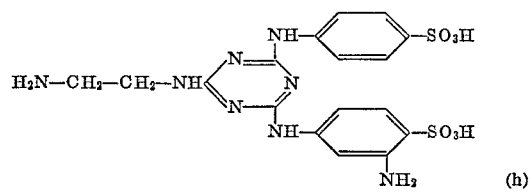

(h)

is obtained.

As phthalocyanine-sulfonic acid chlorides which are used according to the process of the present invention for the production of the phthalocyanine derivatives corresponding to the Formula 4, there may be used, for example, di-, tri- or tetra-sulfonic acid chlorides of, preferably, metalliferous phthalocyanines, such, for instance, as copper-phthalocyanine - (3) - tetrasulfonic acid chloride, copper - phthalocyanine - (3) - trisulfonic acid chloride, nickel-phthalocyanine - (3) - tetra-sulfonic acid chloride, cobalt-phthalocyanine-(3)-trisulfonic acid chloride or copper-phthalocyanine - (4) - tetrasulfonic acid chloride. For said purpose there are likewise suitable sulfonic acid chlorides carrying at the phthalocyanine nucleus further substituents, such as sulfonic acid chlorides of tetraphenyl-copper-phthalocyanine or of tetra-chloronickel-phthalocyanine or, for instance, copper-phthalocyanine-(3)-disulfonic acid chloride-disulfonic acid. The above-mentioned sulfonic acid chlorides are prepared according to known methods, for instance, according to German Patent 891,121.

Representative of amines of Formula 7 which are used for the preparation of the phthalocyanine derivatives of the Formula 4 are, for example, the following compounds: ammonia, methylamine, ethylamine, n-butylamine, benzylamine, aniline, ethanolamine, dimethylamine, diethylamine, di-isopropylamine, N-methylbenzylamine, N-methylaniline, piperidine, morpholine, diethanolamine, 2-aminoethane-1-sulfonic acid, 2-aminoethane-1-carboxylic acid, 4-aminobenzene-carboxylic acid, 3-aminobenzene-sulfonic acid or 4-aminobenzene-sulfonic acid.

As azo-components of the benzene-, naphthalene, pyrazolone-and β-ketocarboxylic acid arylamide series containing one or several times the groups of the Formulae 2, 3 or 5 respectively, and which may be substituted by groups imparting solubility in water, there are named compounds which due to the presence of an aromatically bound amino group, an aromatically bound hydroxy group or an enolisable or enolised ketomethylene grouping are capable of coupling with the above-mentioned diazo compounds of amines of the Formula 4. In the above-mentioned azo components the groups of Formulae 2, 3 or 5 may, for instance, be linked to a carbon atom of an aromatic ring or to a carbon atom of an aliphatic chain. To the above-mentioned group of azo components of the type described, there belong, for example, the following compounds which may be used in the form of their alkali metal salts:

1-amino-3-ethionylaminobenzene,
1-amino-3-(N-methyl-N-ethionylamino)-benzene,
1-dimethylamino-3-(N-methyl-N-ethionylamino)-benzene,
1-hydroxy-4-(β-hydroxyethylsulfonyl)-naphthalene,
1-hydroxy-5-(β-hydroxyethylsulfonyl)-naphthalene,
2-hydroxy-6-(β-hydroxyethylsulfonyl)-naphthalene,
2-amino-5-(β-hydroxyethylsulfonyl)-naphthalene,
2-(N-methyl-N-ethionylamino)-8-hydroxynaphthalene-6-sulfonic acid,
2-(N-methyl-N-ethionylamino)-5-hydroxynapthalene-7-sulfonic acid,
1-(vinylsulfonylamino)-8-hydroxynapthalene-3,6-disulfonic acid,
1-(4'-[N-(β-chloroethylsulfonyl)-N-methylamino]-benzoylamino)-8-hydroxynaphthalene-3,6-disulfonic acid of the formula

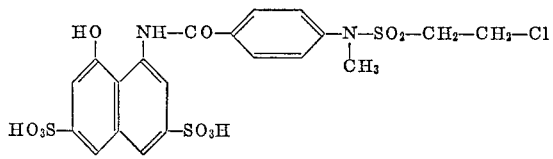

the acid sulfuric acid ester of β-hydroxyethyl-[3-(acetoacetylamino)-phenyl]-sulfone of the formula

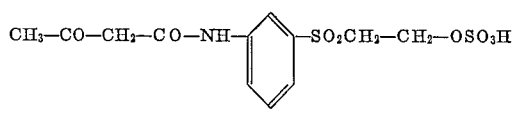

the acid sulfuric acid ester of 1-acetoacetylamino-3,5-di (β-hydroxyethylsulfonyl - methyl - 4 - methylbenzene of the formula

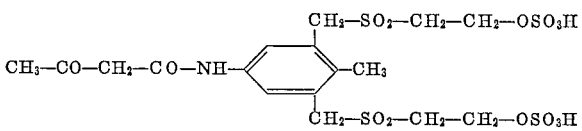

and preferably the acid sulfuric acid ester of 1-[4'-(β - hydroxyethylsulfonyl) - phenyl] - 3 - methyl - 5 - pyrazolone of the formula

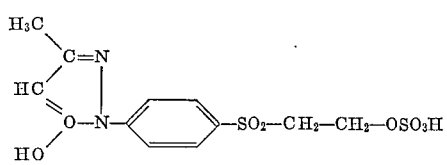

or the acid sulfuric acid ester of 1-[4'-(β-hydroxyethyl-sulfonyl)-phenyl]-3-carboxy-5-pyrazolone of the formula

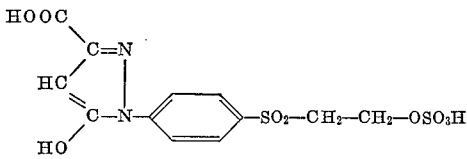

The coupling of the above-mentioned azo-components according to the process of the present invention with the diazotized amines of the Formula 4 can be carried out according to known methods in a weakly alkaline to weakly acid solution and at a temperature as low as possible, for instance at 0 to +10° C. As far as the use of azo-components which one or several times contain the group of the Formula 3 or, especially, one or several times the group of the Formula 2, wherein $R_4$, $m$ and $Z$ have the meanings given above, it is recommended to effect the coupling in a neutral to weakly acid medium in order to avoid secondary reactions.

If, however, the coupling is carried out with azo-components containing one or several times the group of the Formula 5, wherein $R_4$ and $m$ have the meanings given above, the coupling is followed by a further reaction in which at first the azophthalocyanine dyestuffs containing groups of the Formula 5 are converted into dyestuffs with groups of the Formula 2, wherein $R_4$, $m$ and $Z$ have the meanings given above, with inorganic or organic acids or derivatives thereof. From the class of inorganic or organic acids or derivatives thereof which may be used for this second reaction stage, there are mentioned, for instance, the following compounds: sulfuric acid, phosphoric acid, acetic acid anhydride, acetyl-chloride, p-toluenesulfonic acid chloride, chlorosulfonic acid and amidosulfonic acid. Whereas the reaction with the above-mentioned acids is preferably carried out in the absence of solvents or in an excess of said acids serving as solvent, the reaction with the above-mentioned acid derivatives is preferably carried out in the presence of anhydrous solvents or diluents, which are simultaneously active as acid-binding agents, such as, for instance, pyridine, α-picoline or triethylamine.

The process for preparing water-soluble azophthalocyanine dyestuffs of the general Formula 1 by condensation consists in condensing phthalocyanine-sulfonic acid chlorides with aminoazo dyestuffs of the general formula

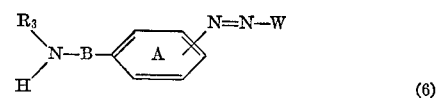

(6)

wherein $R_3$ and B have the meanings given above, the benzene nucleus A may carry additional substituents, particularly groups imparting solubility in water and wherein W represents the radical of an azo-component of the benzene, naphthalene, pyrazolone or β-ketocarboxylic acid-arylamide series which may be substituted by groups imparting solubility in water, said radical containing one or several times the groups of the Formulae 2, 3 or 5, respectively, wherein $R_4$, $m$ and $Z$ have the meanings given above, if desired in the presence of amines of the Formula 7 and, if desired with simultaneous or subsequent saponification of a part of the sulfonic acid chloride groups and (a) Isolating the dyestuffs which contain groups of the Formula 3, (b) Isolating the dyestuffs which contain groups of the Formula 2 or converting them by treatment with alkaline agents, such as, for example, sodium carbonate or sodium hydroxide, into dyestuffs containing groups of the Formula 3, (c) Converting the dyestuffs which contain groups of the Formula 5 at first by treatment with inorganic or organic acids or their derivatives such as, for instance, sulfuric acid or acetic acid anhydride, into dyestuffs with groups of the Formula 2, and isolating the dyestuffs thus obtained or converting them by treatment with alkaline agents, such as sodium carbonate or sodium hydroxide, into dyestuffs containing groups of the Formula 3.

The starting compounds needed for carrying out the process of the present invention by coupling or condensation are so chosen that the forming azophthalocyanine dyestuff of the general Formula 1 contains the necessary number of groups imparting sufficient solubility in water, for instance sulfonic acid groups and/or carboxylic acid groups.

The azophthalocyanine dyestuffs obtained according to the process of the present invention are isolated by salting them out, for instance by means of sodium chloride or potassium chloride, and/or by acidification with a mineral acid or by evaporation of the neutral, aqueous dyestuff solutions, preferably at a moderately elevated temperature and under reduced pressure.

The novel azophthalocyanine dyestuffs obtainable according to the invention by coupling or condensation are suitable for dyeing and printing various materials, such, for instance, as wool, silk, leather and linear polyamides, in particular, however, fibrous materials containing hydroxyl groups such as linen, regenerated cellulose and, above all, cotton.

The new dyestuffs are applied on the fiber by treating the material with an aqueous solution of the dyestuff, for instance, by directly dyeing it in a long bath, by padding or printing it with an aqueous printing paste and subjecting the dyeings or prints simultaneously or subsequently to a treatment with alkaline agents, for instance trisodium-phosphate, sodium-carbonate or sodium-hydroxide or to a treatment by heat. The goods can be dyed at room temperature or at an elevated temperature, for instance, at 50 to 100° C. Furthermore, neutral, inorganic salts such as, for instance, sodium-sulfate can be added.

On application, the new dyestuffs are distinguished by a high absorptivity and a good building up, for instance when the dyeing is carried out according to the exhausting process or the pad-batch process. The stability thereof in alkaline dyebaths is very good.

With the new dyestuffs, appreciated dyeings and prints having high tinctorial strength are obtained on the above-mentioned materials, these dyeings and prints being very fast to wetting and to light, especially when exposed in wet state to light.

The following examples serve to illustrate the invention but they are not intended to limit it thereto, the parts being by weight unless otherwise stated.

Example 1

Into a neutralized solution of 9.45 parts of 1,3-diamino-benzene-4-sulfonic acid in 150 parts of water, 19.4 parts of copper phthalocyanine-(3)-tetrasulfonic acid chloride are introduced in the form of a wet paste while the batch is thoroughly stirred. The suspension thus formed is heated to 50° C. and by adding 2 N-sodium-hydroxide solution the pH-value is adjusted to 9. While stirring of the reaction mixture is continued at the same temperature, care is taken that the pH-value be maintained at 9 by continuously adding 2 N-sodium-hydroxide solution in order to bind the acid split off at the formation of the sulfonamide. As soon as the condensation is terminated and the consumption of sodium hydroxide solution has stopped, the clear blue solution that has formed is allowed to cool to room temperature, and the dyestuff formed is eliminated by adding 2 N-hydrochloric acid. The condensation product is isolated by filtration and the filter residue is washed by means of dilute hydrochloric acid until no diazotizable amine can be detected in the filtrate.

Instead of sodium hydroxide solution there can likewise be used as acid-binding agents sodium carbonate, sodium bicarbonate, ammonia or primary or secondary amines. If ammonia or primary or secondary amines are used, a part of the sulfonic acid chloride groups which do not react with 1,3-diaminobenzene-4-sulfonic acid are converted by means of said agents into the corresponding sulfonamide groups.

An amount of the above-mentioned filter residue calculated on the consumption of 20 parts by volume of 1 N-sodium-nitrite solution are dissolved while neutralized by means of 2 N-sodium hydroxide solution in 250 parts of water, and 20 parts by volume of 1 N-sodium nitrite solution are added. This solution is stirred into a mixture of 14 parts of concentrated hydrochloric acid and 100 parts of ice, so that the temperature of the forming diazo suspension remains below +5° C. Stirring is continued for a further 30 minutes at said temperature and a neutralized aqueous solution of 7.25 parts of the acid sulfuric acid ester of 1-[4'-(β-hydroxyethyl-sulfonyl)-phenyl]-3-methyl-5-pyrazolone is added. By carefully introducing sodium bicarbonate the reaction mixture is adjusted to a pH-value of 6. Upon termination of the coupling, sodium chloride is added to the clear, green solution obtained, and the dyestuff which precipitates is separated by filtration and dried. 40 parts of a green, salt-containing dyestuff are obtained which is very easily soluble in water and dyes wool and cotton green shades with very good fastness properties.

Example 2

19.0 parts of copper-phthalocyanine-(3)-[sulfonic acid-N - (m - carboxy - p - aminophenyl) - amide] - (3',3'')-disulfonic acid (prepared by reaction of 1 mol of copper-phthalocyanine-(3)-trisulfonic acid chloride with 1 mol of 2,5-diaminobenzoic acid and hydrolysis of the remaining sulfonic acid chloride groups) are dissolved in 300 parts of water, with neutralization by means of sodium-hydroxide solution. 20 parts by volume of 1 N-sodium-nitrite solution are added, the mixture is cooled to +5° C. and slowly stirred into a mixture of 60 parts by volume of 2 N-hydrochloric acid and 100 parts of ice, so that the temperature remains below +5° C. The diazo-suspension obtained is stirred for a further 30 minutes while cooled with ice and a neutralized solution of 7.25 parts of the acid sulfuric acid ester of 1-[4'-(β-hydroxyethylsulfonyl)-phenyl]-3-methyl-5-pyrazolone is added. By carefully introducing sodium-bicarbonate the pH-value of the reaction mixture is adjusted to 6. Upon termination of the coupling, the dyestuff obtained is separated off by adding sodium chloride and isolated by filtration. The dyestuff is easily soluble in water and can be used for dyeing and printing native or regenerated cellulose in the presence of alkaline agents. Dark-green dyeings are obtained which show good fastness properties.

Example 3

15.7 parts of nickel-phthalocyanine-(3)-tetrasulfonic acid-N-(m-amino-p-sulfophenyl)-amide (prepared by reaction of 1 mol of nickel-phthalocyanine-(3)-tetrasulfonic acid chloride with 4 mols of 1,3-diaminobenzene-4-sulfonic acid in a mixture of solvents of dimethylformamide and methanol in the presence of an acid-binding agent) are dissolved in 300 parts of water while adding sodium hydroxide solution until the solution shows a neutral reaction. To this solution 40 parts by volume of 1 N-sodium nitrite solution are added, the mixture is cooled to +5° C. and slowly stirred into a mixture of 50 parts by volume of 2 N-hydrochloric acid and 150 parts of ice, so that the temperature does not exceed +5° C.

The diazo-suspension thus obtained is stirred for a further 30 minutes at 0 to +5° C., a neutralized solution of 14.5 parts of the acid sulfuric acid ester of 1[4'-(β - hydroxyethylsulfonyl)-phenyl]-3-methyl - 5 - pyrazolone is then added, and the pH-value is adjusted to 6 by adding soduim bicarbonate. As soon as the coupling is finished, the mixture is heated to 60° C., the green solution obtained is filtered and the dyestuff is isolated by salting it out by means of sodium chloride and by filtration. After drying, 35 parts of a green, salt-containing dyestuff are obtained which is easily soluble in water and in an alkaline bath dyes cotton fabrics yellowish green shades.

Example 4

To a diazo suspension prepared as described in the first paragraph of Example 3 an ice-cold solution of 20.7 parts of the dipotassium salt of 2-(N-methyl-N-ethionylamino)-5-hydroxynaphthalene-7-sulfonic acid corresponding to the formula

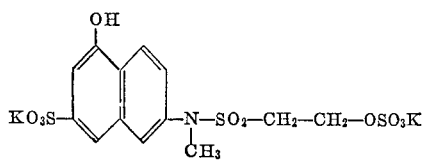

(prepared by reaction of 2-(N-methylamino)-5-hydroxynaphthalene-7-sulfonic acid with carbyl-sulfate) in 100 parts of water is added while thoroughly stirred. By cautious addition of sodium-bicarbonate the pH-value is adjusted to 6. As soon as the coupling is finished, the dyestuff that has formed is separated by salting it out with sodium chloride and isolated by filtration. After drying, 51 parts of a salt-containing dyestuff very easily soluble in water are obtained which in the presence of alkaline agents may serve for dyeing and printing cellulose materials. Olive green dyeings of very good fastness to wetting are hereby obtained.

Example 5

Into a solution of 4.5 parts of 4-aminoacetanilide in 200 parts of water, 19.3 parts of nickelphthalocyanine-(3)-tetrasulfonic acid chloride are introduced while carefully stirring, and the reaction mixture is heated to 50° C. By dropwise adding 2 N-sodium hydroxide solution the pH-value is adjusted to 9.5 to 10 and maintained. After about 5 hours a clear, blue solution has formed and the addition of sodium hydroxide solution is terminated. 350 parts of concentrated hydrochloric acid are added and the mixture is stirred for a further 3 hours at a temperature of 80 to 85° C. It is allowed to cool to room temperature, the precipitated reaction product is filtered off and washed with dilute hydrochloric acid.

An amount of wet filter residue, calculated on the consumption of 20 parts by volume of 1 N-sodium-nitrite solution, is dissolved in 200 parts of water with simultaneous addition of about 30 parts of sodium hydroxide solution of 33% strength. To this solution 20 parts by volume of 1 N-sodium-nitrite solution are added and this mixture is stirred into 20 parts of concentrated hydrochloric acid and 100 parts of ice. The diazo suspension obtained is stirred for 30 minutes while cooled with ice, and a solution of 7.25 parts of the acid sulfuric acid ester of 1[4' - ($\beta$ - hydroxyethylsulfonyl) - phenyl]-3-methyl-5-pyrazolone in 200 parts of water is then added. By adding sodium bicarbonate the pH-value is adjusted to 6. Upon termination of the coupling the dyestuff is completely separated by adding sodium chloride and isolated by filtration. After drying, 34 parts of a salt-containing green dyestuff are obtained which under the action of acid binding agents dyes cotton green shades with good fastness properties.

Dyestuffs showing similar properties are obtained if in the above-described reaction instead of 4-aminoacetanilide, equivalent amounts of the compounds mentioned hereafter are used:

3-aminoacetanilide, 2-acetamino-4-amino-anisole or 2-acetamino-4-amino-toluene.

Example 6

To a neutralized solution of 94 parts of 1,3-diaminobenzene-4-sulfonic acid in 800 parts of water, 5 parts of sodium bicarbonate and 2.5 parts of the disodium salt of dinaphthylmethane disulfonic acid are added, the solution is cooled to 0° and 92.5 parts of cyanuric chloride are slowly introduced while vigorously stirring at a temperature between 0 and +5° C. Simultaneously, the reaction mixture is maintained neutral by dropwise adding 2 N-sodium hydroxide solution. As soon as all cyanuric chloride is introduced and the reaction is completed, a neutralized solution of 86.5 parts of 1-aminobenzene-3-sulfonic acid in 250 parts of water is added. The reaction mixture is now heated to 50° C. and maintained neutral by continuously dropping in 2 N-sodium hydroxide solution until the consumption of sodium hydroxide ceases. 120 parts of ethylene-diamine are then added and the mixture is boiled for 30 minutes under reflux. It is allowed to cool to room temperature and the batch is stirred into a mixture of 200 parts of ice and 400 parts of concentrated hydrochloric acid. A reaction product corresponding to the formula

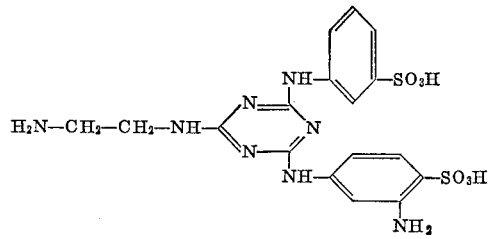

is isolated by filtration, washed with water and dried at 60° C.

30 parts of the product thus obtained are dissolved in 300 parts of water while adding sodium hydroxide solution. Into this solution, at a pH-value of 9.5 and a temperature of 50° C., 9.65 parts of nickelphthalocyanine-(3)-tetrasulfonic acid chloride are introduced in the form of a moist paste and the mixture is stirred at 50° C., the pH-value of 9.5 being maintained by continuously adding further amounts of 2 N-sodium hydroxide solution. As soon as the reaction is terminated and the consumption of sodium hydroxide solution ceases, the reaction mixture is allowed to cool to room temperature, the condensation product is separated by acidification to pH 4.5 and addition of NaCl, and isolated by filtration. The filter residue obtained is washed with sodium chloride solution.

A quantity of the above-mentioned filter residue, calculated on the consumption of 20 parts by volume of 1 N sodium nitrite solution, is dissolved in 100 parts of water while a small amount of sodium hydroxide solution is added. To this solution, 20 parts by volume of 1 N-sodium-nitrite solution are added and the mixture is stirred into a mixture of 25 parts by volume of 2 N-hydrochloric acid and about 50 parts of ice, so that the temperature of the forming diazo suspension does not exceed +5° C. Stirring at this temperature is continued for 30 minutes and a neutralized, aqueous solution of 7.25 parts of the acid sulfuric acid ester of 1-[4'-($\beta$-hydroxyethylsulfonyl)-phenyl]-3-methyl-5-pyrazolone is added. By cautiously adding sodium bicarbonate the reaction mixture is adjusted to pH 6 and this value is maintained constant. Upon termination of the coupling, sodium chloride is added to the clear green solution obtained, the precipitated dyestuff is separated off by filtration and then dried. 29.6 parts of a salt-containing green dyestuff are obtained which are easily soluble in water. In the presenec of alkaline agents the dyestuff dyes cotton fabric yellow-green shades with very good fastness properties.

Azophthalocyanine dyestuffs of similar properties are obtained if, in the above-described reaction instead of nickelphthalocyanine-(3)-tetrasulfonic acid chloride, equivalent amounts of copper-phthalocyanine-(3)-tetrasulfonic acid chloride or of a metal-free phthalocyanine-(3)-sulfonic acid chloride are used.

Example 7

Into a neutralized solution of 37.6 parts of 1,3-diaminobenzene-4-sulfonic acid in 500 parts of water a solution of 18.5 parts of cyanuric chloride in 80 parts of acetone is slowly introduced with vigorous stirring at 0 to +5° C., and by simultaneous dropwise addition of 2 N-sodium hydroxide solution the pH-value of 7 is maintained. Stirring of the reaction mixture is continued for 1 hour at 0° C. to +5° C. and then for 1 hour at 45° C. By continuously adding 2 N-sodium hydroxide solution during the stirring period the reaction mixture is maintained neutral. After these operations, about 100 parts by volume of 2 N-sodium hydroxide solution htave been consumed. A mixture of 24 parts of ethylene-diamine and 50 parts of water is then added, the acetone is removed from the reaction mixture by distillation and the remaining solution is heated for 30 minutes to 100° C. The batch is then cooled to room temperature and slowly introduced into a mixture of 60 parts of concentrated hydrochloric acid, 150 parts of water and 150 parts of ice. The precipitating product of the formula

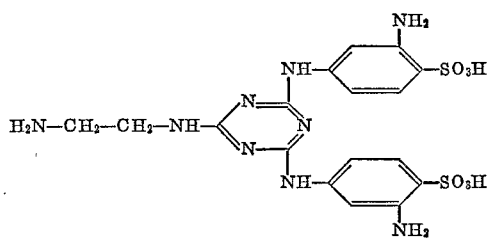

is filtered off and washed with water. For purification, the wet filter residue is taken up in 50 parts of water, dissolved with sodium hydroxide solution and again precipitated by means of hydrochloric acid. Filtration is renewed, the reaction product is washed with water and dried at 40° C. under reduced pressure.

20 parts of the product thus obtained are dissolved in 200 parts of water, with addition of sodium hydroxide solution. Into this solution, at a pH-value of 9.5 and a temperature of 50° C., 19.3 parts of nickel-phthalocyanine-(3)-tetrasulfonic acid chloride are introduced in the form of a wet paste. The mixture is heated to 50° C. with stirring and the pH-value of 9.5 is maintained by continuously adding 2 N-sodium hydroxide solution. As soon as the condensation is terminated and the consumption of sodium hydroxide solution has ceased, the batch is allowed to cool to room temperature, the sulfonamide formed is separated off by adding potassium chloride and sodium chloride and the product is isolated by filtration. The filter residue is washed with saturated sodium chloride solution.

An amount of the above-mentioned filter residue calculated on a consumption of 20 parts by volume of 1 N-sodium-nitrate solution is dissolved in 150 parts of water, and 20 parts by volume of 1 N-sodium-nitrite solution are added. This solution is stirred into a mixture of 35 parts by volume of 2 N-hydrochloric acid and about 50 parts of ice, so that the temperature of the forming diazo suspension does not exceed +5° C. Stirring is continued for 30 minutes at this temperature and a neutralized aqueous solution of 7.25 parts of the acid sulfuric acid ester of 1-[4'-(β-hydroxyethylsulfonyl)-phenyl]-3-methyl-5-pyrazolone is added. By careful addition of sodium bicarbonate the reaction mixture is adjusted to pH 6 and it is maintained constant at said pH-value. Upon termination of the coupling, sodium chloride is added to the clear green solution, the precipitated dyestuff is separated by filtration and then dried. 25 parts of a salt-containing green dyestuff are obtained which are easily soluble in water. The dyestuff can be used for dyeing and printing natural or regenerated cellulose in the presence of alkaline agents and gives yellowish-green dyeings and prints of very good fastness properties.

If in the above example, instead of the acid sulfuric acid ester of 1-[4'-(β-hydroxyethylsulfonyl)-phenyl]-3-methyl-5-pyrazolone, equivalent amounts of the azo components mentioned in the following table are used, dyestuffs possessing similar dyeing properties are obtained.

Table

| Azo component: | Shade |
|---|---|
| Acid sulfuric acid ester of 2-hydroxy-6 - (β - hydroxyethylsulfonyl)-naphthalene | Greenish grey. |
| 2-(N-methyl - N - ethionylamino)-8-hydroxynaphthalene - 6 - sulfonic acid | Bluish brown. |
| 2-(N-methyl - N - ethionylamino)-5-hydroxynaphthalene - 7 - sulfonic acid | Brown. |
| 1 - (vinylsulfonyl - amino) - 8 - hydroxynaphthalene - 3,6 - disulfonic acid | Violet. |
| Acid sulfuric acid ester of 1-acetoacetylamino - 3,5 - di-(β-hydroxyethylsulfonyl-methyl) - 4 - methylbenzene. | Green. |
| Acid sulfuric acid ester of β-hydroxyethyl - [3 - (acetoacetylamino)-phenyl]-sulfone | Green. |
| 1-amino-3-ethionylaminobenzene | Green. |
| 1-amino-3-(N-methyl - N - ethionylamino)-benzene | Green. |
| 1-amino-3-(N-β-cyanethyl - N - ethionylamino)-benzene | Green. |

Example 8

13.6 parts of 1-(β-aminoethyl)-benzene-4-sulfonic acid-N-(3'-sulfo-4'-aminophenyl)-amide of the formula

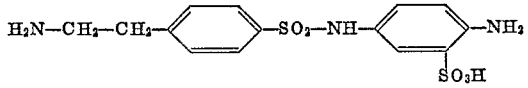

the preparation of which is described below, are dissolved in 150 parts of water, with addition of sodium hydroxide solution. At a pH-value of 9.5 and with careful stirring, 9.65 parts of nickel-phthalocyanine-(3)-tetrasulfonic acid chloride in the form of a wet paste are introduced into this solution. The reaction mixture is heated to 50° C. and stirring is continued for several hours at the above-mentioned temperature, the pH-value being maintained at 9.5 by continuously adding 2 N-sodium hydroxide solution. As soon as the condensation is terminated and the consumption of sodium hydroxide solution has ceased, the condensation product is precipitated by adding hydrochloric acid, is isolated by filtration and is washed with dilute hydrochloric acid.

An amount of the wet filter residue based on the consumption of 20 parts by volume of 1 N-sodium nitrite solution is dissolved with neutralization by means of sodium hydroxide solution in 200 parts of water, and 20 parts by volume of 1 N-sodium nitrite solution are added. This solution is stirred into a mixture of 50 parts by volume of 2 N-hydrochloric acid and about 50 parts of ice are stirred in, so that the temperature of the forming diazo suspension remains below +5° C. Stirring is continued for 30 minutes at the above-mentioned temperature, and a neutralized aqueous soltuion of 7.25 parts of the acid sulfuric acid ester of 1-[4'-(β-hydroxyethylsulfonyl)-phenyl]-3-methyl-5-pyrazolone is added. By cautiously adding sodium bicarbonate the reaction mixture is now adjusted to pH 6 and maintained constant on said value. Upon termination of the coupling, sodium chloride is added to the obtained clear green solution and the precipitated dyestuff is separated by filtration and then dried. 22.6 parts of a salt-containing green dyestuff are obtained. The dyestuff can be applied in the usual manner with the use of alkaline agents on cotton and regenerated cellulose, can be fixed by a thermal treatment and yields green dyeings and prints which possess very good fastness to washing and light.

The starting product for the production of said dyestuff, i.e. 1-(β-aminoethyl)-benzene-4-sulfonic acid-N-(3'-sulfo-4'-amino-phenyl)-amide of the above-mentioned formula can be obtained, for instance by the following method:

N-acetyl-β-phenylethylamine is converted by treatment with chlorosulfonic acid into 1-(β-acetylamino-ethyl)-benzene-4-sulfonic acid chloride, the latter is reacted with 1,4-diamino-benzene-2-sulfonic acid and the condensation product obtained is then subjected to hydrolysis with sodium hydroxide solution.

If, when preparing the above-mentioned dyestuff, instead of 1-(β-aminoethyl)-benzene-4-sulfonic acid-N-(3'-sulfo-4'-aminophenyl)-amide, the same amount of 1-(β-aminoethyl)-benzene-4-sulfonic acid-N-(3'-amino-4' - sulfophenyl)-amide is used and it is further operated as described above, a dyestuff possessing similar properties is obtained.

Example 9

18.7 parts of the dyestuff of the formula

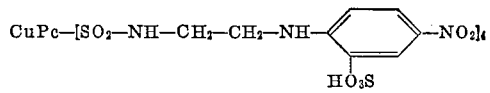

whose preparation is described further below are dissolved in 100 parts of water with addition of a small amount of sodium hydroxide solution until the solution shows a neutral reaction. A solution of 14.4 parts of crystalline sodium sulfide in 50 parts of water is added and the mixture is boiled for 1 hour under reflux. 15 parts of concentrated hydrochloric acid are then slowly added and the batch is heated for a further 30 minutes to the boil. It is then allowed to cool to 60° C., the separated product is filtered off and washed with water. The filter residue is dissolved with addition of 20 parts by volume of 2 N-sodium hydroxide solution in 200 parts of water, and the solution that forms is cleared by filtration after addition of a small amount of charcoal and kieselguhr. The filtrate is acidified by means of hydrochloric acid, boiled for some minutes, and the precipitating product is separated by filtration and washed with dilute hydrochloric acid. An amount of the wet filter residue, calculated on the consumption of 40 parts by volume of 1 N-sodium nitrite solution, is dissolved in 200 parts of water with addition of sodium hydroxide solution. To this solution, 40 parts by volume of 1 N-sodium nitrite solution are added and this mixture is slowly added with stirring to a mixture of 70 parts by volume of 2 N-hydrochloric acid, 100 parts of water and 100 parts of ice, the temperature not being allowed to exceed +5° C. The diazo-suspension obtained is stirred for 30 minutes at 0 to +5° C., a neutralized solution of 14.5 parts of the acid sulfuric acid ester of 1-[4'-(β-hydroxyethylsufonyl)-phenyl]-3-methyl-5 - pyrazolone in 100 parts of water is added, the pH-value of the mixture is adjusted to 6 by adding sodium bicarbonate and this pH-value is maintained until the coupling is terminated. The dyestuff is isolated by salting it out with sodium chloride and by filtration. After drying, 52.5 parts of a salt-containing dyestuff remain behind which can be fixed on cotton fabrics in the usual manner with the aid of alkaline agents. Green dyeings or prints are obtained which under the action of acids turn to brown.

The starting dyestuff used for the production of the dyestuff shown by the above formula can be prepared, for instance, in the following manner: 13 parts of N-(4-nitro-2-sulfophenyl)ethylenediamine (obtainable by reaction of 4-chloro-1-nitro-benzene-3-sulfonic acid with ethylene-diamine in the presence of copper-II-chloride) are dissolved in 50 parts of water with addition of 25 parts by volume of 2N-sodium hydroxide solution. The solution obtained is heated to 50° C. and 9.7 parts of copper-phthalocyanine-(3)-tetrasulfonic acid chloride are slowly introduced in the form of a wet paste at a pH-value of 9.5 to 10 while vigorously stirring. By continuously dropping in dilute sodium hydroxide solution the pH-value of 9.5 to 10 is maintained and the batch is stirred at 50° C. until the absorption of sodium hydroxide solution is terminated. The reaction mixture is then allowed to cool to room temperature and the solution is acidified by means of acetic acid, whereby nonreacted N-(4-nitro-2-sulfophenyl)-ethylene-diamine separates. It is removed by filtration and the dyestuff of the above-mentioned formula that has formed is isolated from the acetic acid filtrate by salting it out with sodium chloride.

Example 10

16.6 parts of the azo dyestuff corresponding to the formula

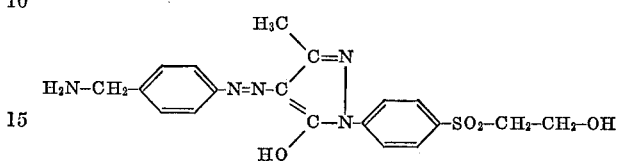

together with 21.2 parts of sodium carbonate and 19.3 parts of nickel-phthalocyanine-(3)-tetrasulfonic acid chloride, which is used in the form of a wet paste, are suspended in 500 parts of water. While thoroughly stirring, this suspension is heated within 30 minutes to 90° C. and this temperature is maintained for 5 hours. The reaction mixture is then allowed to cool to room temperature and is slowly stirred into a mixture of 75 parts of concentrated hydrochloric acid and 75 parts of water. The separated condensation product is filtered off, washed with dilute hydrochloric acid, dried at 100° C. and ground. The compound is then slowly introduced into 285 parts of concentrated sulfuric acid at a temperature below +10° C. and with stirring, and the esterification mixture is stirred for 10 to 12 hours at room temperature. The solution thus formed is poured into a vigorously stirred mixture of 250 parts of saturated sodium chloride solution and 700 parts of ice, and the ester dyestuff formed is immediately filtered off and washed with sodium chloride solution. For purification, the moist filter cake is dissolved in 500 parts of water with addition of sodium bicarbonate until the solution shows a neutral reaction. The dyestuff is then completely separated by salting it out with sodium chloride and isolated by filtration. After drying, 60 parts of the green salt-containing dyestuff are obtained which can be used for dyeing and printing cellulose materials in the presence of alkaline agents, yielding green dyeings and prints of good fastness to washing and to light. Green dyestuffs with similar good dyeing properties are obtained if, for the condensation with the phthalocyanine derivative instead of the above-mentioned azo dyestuff, the same amount by weight of the azo dyestuff of the formula

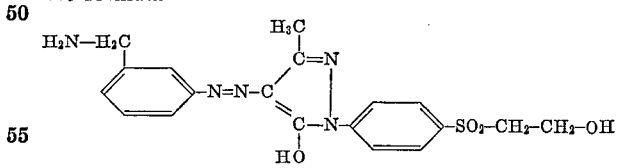

or 17.2 parts of the azo dyestuff of the formula

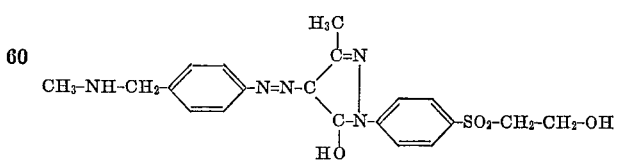

are used, the further treatment being the same as described above.

Example 11

37.5 parts of 4-aminoacetanilide and 80 parts of sodium carbonate are dissolved in 1000 parts of water. Into this solution 96.5 parts of nickelphthalocyanine-(3)-tetrasulfonic acid chloride are introduced in the form of a wet paste, while carefully stirring, and the reaction mixture is heated within 30 minutes to 90° C. Stirring is continued for 3 hours at this temperature, 1200 parts of concentrated hydrochloric acid are slowly added and the mixture is stirred for a further 3 hours at 80–85° C. The mixture is then allowed to cool to room temperature, the product formed is isolated by filtration and washed with dilute hydrochloric acid and with water.

An amount of wet filter residue, calculated on a consumption, of 20 parts by volume of 1 N-sodium nitrate solution, is dissolved in 150 parts of water with addition of 12.5 parts by volume of 2 N-sodium hydroxide solution. To this solution, 20 parts by volume of 1 N-sodium nitrite solution are added and this mixture is stirred into the mixture of 50 parts by volume of 2 N-hydrochloric acid and 100 parts of ice, so that the temperature does not exceed +5° C. The diazo suspension obtained is stirred for 30 minutes while cooled with ice. The solution of 10.9 parts of the dipotassium salt of 2-(N-methyl-N-ethionylamino)-5-hydroxynaphthalene-7-sulfonic acid in 100 parts of water is then added and the pH-value is adjusted to 6 by adding sodium bicarbonate. Upon termination of the coupling the dyestuff formed is completely separated by adding sodium chloride and isolated by filtration. After drying, 41 parts of a salt-containing dyestuff are obtained that dye cotton fabrics grey shades of very good fastness properties under the action of alkaline agents.

If, in the present example, there is used as azo component, instead of 2-(N-methyl-N-ethionylamino)-5-hydroxynaphthalene-7-sulfonic acid, the equivalent amount of the acid sulfuric acid ester of 1-acetoacetylamino-3,5-di-(β-hydroxyethylsulfonylmethyl)-4-methylbenzene of the formula

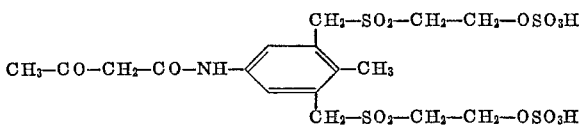

a green dyestuff is obtained which shows similar dyeing properties. If instead of the above-mentioned compound there is used as azo component the acid sulfuric acid ester of 1-[4′-(β-hydroxy-ethylsulfonyl)-phenyl]-3-carboxy - 5-pyrazolone of the formula

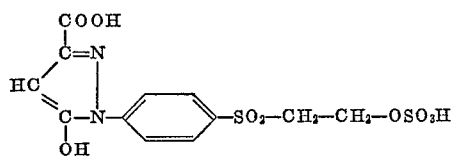

a green dyestuff is obtained which in the presence of acid-binding agents dyes cotton fabrics yellowish green shades of good fastness properties.

Example 12

37.5 parts of 1-amino-3-acetaminobenzene are suspended in 600 parts of water. 65 parts of anhydrous sodium carbonate are added and 96.5 parts of nickel-phthalocyanine-(3)-tetrasulfonic acid chloride are then introduced in the form of a wet paste. The mixture is heated to 50° C. and then stirred for 15 hours, and then for 2 hours at 70° C. 270 parts of concentrated sulfuric acid are then slowly dropped in, whereby the reaction temperature rises to about 90° C. Stirring is continued for 4 hours at 90° C., the mixture is allowed to cool to room temperature, the condensation product is filtered off and washed with water until the filtrate running off no more contains diazotizable amine. The wet filter residue is dissolved in 250 parts of water with addition of 68 parts of sodium hydroxide solution of 33% strength. To this solution, 38 parts of sodium nitrite solution of 40% strength are added, and this mixture is slowly poured at a temperature below +5° C. into a thoroughly stirred mixture of 600 parts of ice and 100 parts of concentrated hydrochloric acid. Stirring is continued for 30 minutes at +5° C. and the excess of nitrous acid which may still be present is destroyed with the aid of amidosulfonic acid.

To the diazo suspension thus obtained a neutralized solution of 83.6 parts of the acid sulfuric acid ester of 1-[4′-(β-hydroxyethylsulfonyl) - phenyl] - 3 - methyl-5-pyrazolone in 2000 parts of water is added. 115 parts of crystallized sodium acetate are then introduced and the reaction mixture is stirred at room temperature until the coupling is terminated. The azophthalocyanine dyestuff is isolated by filtration, and after drying, 230 parts of a salt-containing green dyestuff are obtained which is very easily soluble in hot water and in the presence of acid-binding agents dyes cotton green shades with very good fastness properties.

Dyestuffs of similar properties are obtained if, as azo component, instead of the acid sulfuric acid ester of 1-[4′-(β-hydroxyethylsulfonyl)-phenyl] - 3 - methyl-5-pyrazolone, equivalent amounts of the acid sulfuric acid ester of the following compounds are used:

1-[2′-methyl-5′-(β-hydroxyethylsulfonyl) - phenyl] - 3-methyl - 5 - pyrazolone, 1-[2′-methoxy-5′-(β-hydroxyethylsulfonyl)-phenyl]-3-methyl-5-pyrazolone or 1-[4′-(β-hydroxyethylsulfonyl) - phenyl]-3-carboxyl-5-pyrazolone.

Example 13

To a diazo suspension prepared as described in the first paragraph of Example 12, a neutralized solution of 94.5 parts of 1-vinylsulfonylamino - 8 - hydroxy-naphthalene-3,6-disulfonic acid (prepared by reaction of 1-amino-8-hydroxy-naphthalene-3,6-disulfonic acid with carbyl-sulfate and subsequent treatment with sodium hydroxide solution) in 3000 parts of water are added, 150 parts of crystallized sodium acetate are then slowly introduced and the mixture is stirred at room temperature until the coupling is terminated. The dyestuff formed is isolated by salting it out with sodium chloride. After drying, 375 parts of a salt-containing dyestuff are obtained that can be fixed on cotton fabrics in the usual manner with the aid of alkaline agents and yields violet dyeings or prints of good fastness to wetting.

Dyestuffs possessing similar properties are obtained if in the above-described reaction, instead of 1-vinyl-sulfonylamino-8-hydroxy-naphthalene - 3,6 - disulfonic acid, equivalent amounts of 1-{4′-[N-(β-chloroethylsulfonyl)-N-methylamino] - benzoylamino}-8-hydroxynapththalene-3,6-disulfonic acid of the formula

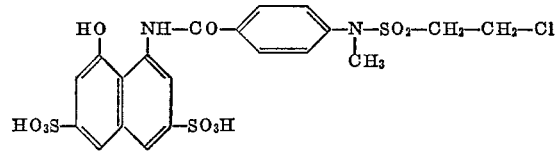

(obtainable by reaction of 4-[N-(β-chloroethylsulfonyl)-N-methylamino]-benzene-carboxylic acid chloride of a melting point of 55° C. with 1-amino-8-hydroxynaphthalene-3,6-disulfonic acid) or of 1-[3′-(β-acetoxyethylsulfonyl)-benzoylamino] - 8 - hydroxynaphthalene-3,6-disulfonic acid of the formula

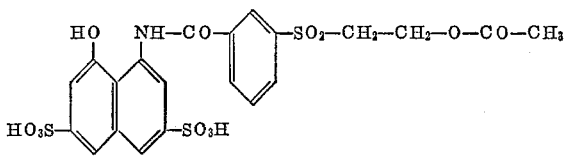

(obtainable by reaction of 3-(β-acetoxyethylsulfonyl)-benzene-carboxylic acid chloride of a melting point of 80° C. with 1-amino - 8 - hydroxynaphthalene-3,6-disulfonic acid) are used.

Example 14

22.5 parts of 1-amino-3-acetaminobenzene are dissolved in 400 parts of water. To this solution 50 parts by volume of an aqueous 2 N-ammonia solution are added and 96.5 parts of nickel-phthalocyanine-(3)-tetrasulfonic acid chloride are introduced in the form of a wet paste. The reaction mixture is heated to 50° C. and stirred for 6 hours at this temperature, and stirring is continued for 2 hours at 70° C. During all this time the pH-value is maintained at 9 by continuously dropwise adding sodium hydroxide solution of 33% strength. The mixture is then allowed to cool to room temperature, and the condensation product is separated off by acidification with sulfuric acid, is filtered off and is washed with water. The wet filter residue is suspended in 800 parts of water, 110 parts of concentrated sulfuric acid are added, the whole is heated to 90° C. and stirred for 4 hours at this temperature. The mixture is then allowed to cool to room temperature, and the separated reaction product is filtered off and washed with water until the filtrate no longer contains diazotizable amine.

The wet filter residue is now dissolved in 250 parts of water with addition of 68 parts of sodium hydroxide solution of 33% strength. To this solution 22 parts by volume of 5 N-sodium nitrite solution are added and the mixture obtained is introduced into a mixture of 700 parts of ice and 95 parts of concentrated hydrochloric acid so that the temperature remains below +5° C. The diazo suspension is stirred for a further 30 minutes with cooling by means of ice, a neutralized solution of 41.6 parts of the acid sulfuric acid ester of 1-[4'-(β-hydroxyethylsulfonyl)-phenyl]-3-methyl-5-pyrazolone in 700 parts of water and 100 parts of crystallized sodium acetate are added, and the mixture is stirred at room temperature until the coupling is terminated. The dyestuff is then isolated by filtration and dried at 40° C. under reduced pressure. 195 parts of a salt-containing green dyestuff are obtained. This dyestuff is very easily soluble in hot water and in the presence of acid-binding agents dyes cotton fabrics green shades with very good fastness properties.

Dyestuffs with similar good properties can be obtained if, in the present example for the preparation of the diazo-component described in the first paragraph, instead of the ammonia, equivalent amounts of the following amines are used:

Methylamine, ethylamine, dimethylamine, diethylamine, diethanolamine, piperidine, N-methylaniline, N-methylbenzylamine, 2-aminoethane-1-carboxylic acid or 3-aminobenzenesulfonic acid.

Example 15

To a diazo-suspension prepared as described in the first paragraph of Example 12, a neutralized solution of 84.4 parts of the acid sulfuric acid ester of β-hydroxyethyl-[3-(acetoacetylamino)-phenyl]-sulfone in 3000 parts of water are added, 150 parts of crystallized sodium acetate are then slowly introduced and the mixture is stirred at room temperature until the coupling is terminated. After drying, 375 parts of a salt-containing dyestuff are obtained which can be fixed in the usual manner on cotton fabrics with the aid of alkaline agents. It yields blue-green dyeings or prints of good fastness to wetting.

Example 16

9.4 parts of 4-nitrobenzylamine-hydrochloride and 16 parts of sodium carbonate are dissolved in 600 parts of water. Into this solution 19.3 parts of nickel-phthalocyanine-(3)-tetrasulfonic acid chloride in the form of a wet paste are introduced with stirring and the mixture is then heated for 2 hours to 90° C. It is then allowed to cool to room temperature, acidified by means of dilute hydrochloric acid, filtered, and the filter residue is washed with water. The wet filter residue is suspended in 200 parts of water and 200 parts of ethanol, and this suspension is heated to 80° C. After addition of 20 parts by volume of 2 N-sodium hydroxide solution and 20 parts of sodium-hydrogen-sulfide solution of 31% strength, the mixture is stirred at the above-mentioned temperature for 15 minutes. It is allowed to cool, acidified by means of dilute hydrochloric acid, filtered and the filter residue is washed with water.

The wet filter residue is dissolved in 190 parts of dimethyl-formamide. To this solution 42 parts by volume of 1 N-sodium nitrite solution are added and the mixture obtained is slowly poured at a temperature below +5° C. into a well stirred mixture of 60 parts by volume of 2 N-hydrochloric acid and 300 parts of ice. Stirring is continued for 30 minutes with ice-cooling, and an excess of nitrous acid which may be present is destroyed with the aid of amidosulfonic acid. A neutralized solution of 15.2 parts of the acid sulfuric acid ester of 1-[4'-(β-hydroxyethylsulfonyl)-phenyl]-3-methyl-5-pyrazolone in 500 parts of water and 25 parts of crystallized sodium acetate are then added and the mixture is stirred at room temperature until the coupling is terminated. The dyestuff formed is isolated by salting it out and dried. 62 parts of a salt-containing green dyestuff are obtained which is very easily soluble in hot water and, in the presence of acid-binding agents, dyes cotton fabrics green shades with very good fastness properties.

Dyestuffs showing similar good properties can be obtained by using, instead of the 4-nitro-benzylamine-hydrochloride used in the above example, equivalent amounts of the hydrochlorides of the following amines:

3-nitrobenzylamine, 2-methyl-5-nitrobenzylamine, 2-methoxy-5-nitrobenzylamine, 3-nitro-4-methylbenzylamine, or 3-nitro-4-methoxybenzylamine.

We claim:
1. A water-soluble azo-phthalocyanine dyestuff of the formula

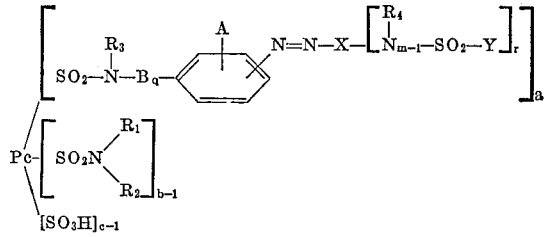

wherein Pc represents phthalocyanine, copper-phthalocyanine, nickel-phthalocyanine, cobalt-phthalocyanine, tetraphenyl-copper-phthalocyanine or tetrachloro-nickel-phthalocyanine, A represents chlorine, lower alkyl, lower alkoxy, sulfonic acid or carboxylic acid, B represents a grouping

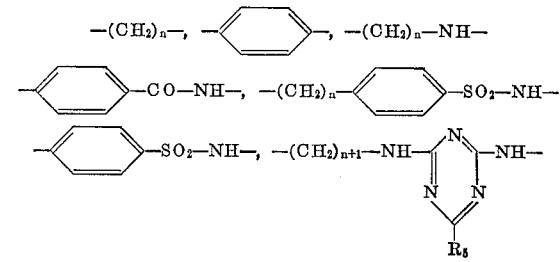

or

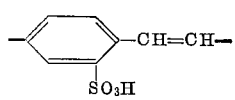

in which $n$ is an integer of 1 to 2 and $R_5$ represents the group

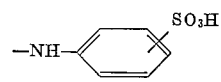

$q$ is an integer 0 or 1, or the group

is

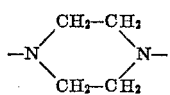

$R_1$ and $R_2$ each represents a hydrogen, a lower alkyl, a lower alkyl substituted by hydroxy, phenyl, carboxylic acid or sulfonic acid, a phenyl, a phenyl substituted by carboxylic acid or sulfonic acid, or taken together with the nitrogen to which they are attached $R_1$ and $R_2$ are piperidino or morpholino, $R_3$ represents hydrogen or lower alkyl, $R_4$ represents hydrogen, lower alkyl or β-cyanoethyl, X represents (a) benzene substituted by amino or di-(lower alkyl)-amino,
(b) hydoxynaphthalene or aminonaphthalene,
(c) hydroxynaphthalene substituted once or twice by sulfonic acid,
(d) hydroxynaphthalene disulfonic acid substituted by benzoylamino,
(e) 1-phenyl-5-pyrazolone substituted at the 3-position by lower alkyl or carboxylic acid,
(f) 1-phenyl-3-methyl-5-pyrazolone substituted on the phenyl group by lower alkyl or lower alkoxy,
(g) acetoacetic acid phenyl amide, or
(h) acetoacetic acid phenyl amide substituted on the phenyl group by lower alkyl, Y represents a group —$CH_2$—$CH_2$—CL,

—$CH_2$—$CH_2$—O—$SO_3H$

—$CH_2$—$CH_2$—O—CO—$CH_3$ or —CH=$CH_2$, $a$, $b$ and $c$ each is an integer of 1 to 4, their sum being at most 6, and $m$ and $r$ each is an integer 1 or 2.

2. The dyestuff of the formula

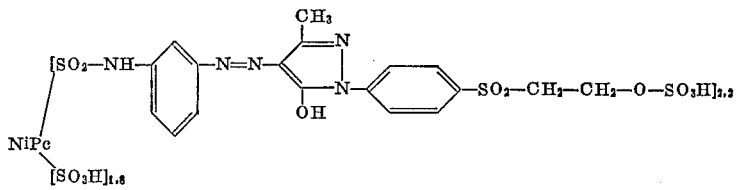

3. The dyestuff of the formula

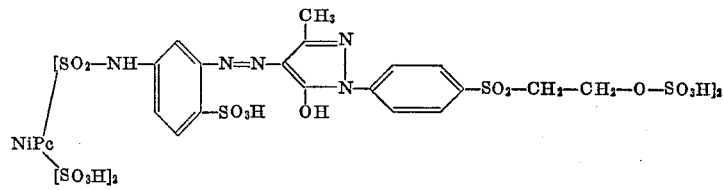

4. The dyestuff of the formula

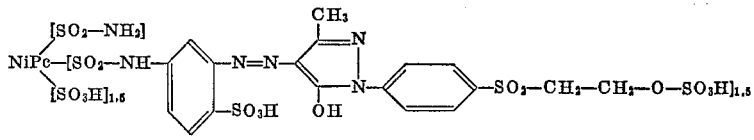

5. The dyestuff of the formula

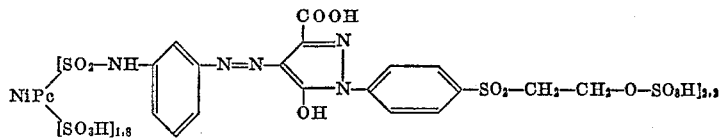

6. The dyestuff of the formula

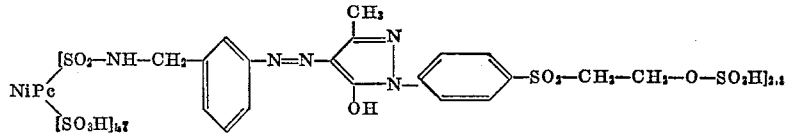

References Cited

UNITED STATES PATENTS 3,132,129  5/1964  Dortmann et al. _____ 260—147
3,235,540  2/1966  Dortmann et al. _____ 260—147

CHARLES B. PARKER, *Primary Examiner.*

D. M. PAPUGA, *Assistant Examiner.*

U.S. Cl. X.R.

8—41, 51, 13, 54.2, 55; 260—37, 146, 152, 153, 163, 249.6, 249.8, 310, 314.5, 457, 556